(12) United States Patent
Shoji et al.

(10) Patent No.: US 11,693,480 B2
(45) Date of Patent: *Jul. 4, 2023

(54) TACTILE SYSTEM

(71) Applicant: Nippon Telegraph and Telephone Corporation, Tokyo (JP)

(72) Inventors: Tetsufumi Shoji, Tokyo (JP); Toshiki Wada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 16/981,382

(22) PCT Filed: Feb. 26, 2019

(86) PCT No.: PCT/JP2019/007222
§ 371 (c)(1),
(2) Date: Sep. 16, 2020

(87) PCT Pub. No.: WO2019/187891
PCT Pub. Date: Oct. 3, 2019

(65) Prior Publication Data
US 2021/0048886 A1    Feb. 18, 2021

(30) Foreign Application Priority Data

Mar. 26, 2018  (JP) ................. 2018-057757

(51) Int. Cl.
*G06F 3/01* (2006.01)
*G06F 3/044* (2006.01)
(Continued)

(52) U.S. Cl.
CPC ............. *G06F 3/016* (2013.01); *G06F 3/044* (2013.01); *G08B 6/00* (2013.01); *G09B 19/003* (2013.01)

(58) Field of Classification Search
CPC .......... G06F 3/016; G06F 3/044; G08B 6/00; G09B 19/003
(Continued)

(56) References Cited

U.S. PATENT DOCUMENTS

2014/0078117 A1* 3/2014 Asano ................. G09B 11/00
345/179
2017/0136354 A1* 5/2017 Yamano .............. G06F 1/1632
(Continued)

FOREIGN PATENT DOCUMENTS

JP    2004318399 A  * 11/2004
JP    201462962       4/2014
(Continued)

*Primary Examiner* — Quan Zhen Wang
*Assistant Examiner* — Mancil Littlejohn, Jr.
(74) *Attorney, Agent, or Firm* — Slater Matsil, LLP

(57) ABSTRACT

A haptic system includes a haptic device and a control device. A sensor of the haptic device detects contact of a finger of a user who grips a casing, a determination unit of the control device determines whether sensor information on a contact position of the finger detected by the sensor of the haptic device matches preset reference position information, and an instruction unit sends a notification unit a notification instruction in at least one of cases where the sensor information does not match the reference position information and where the sensor information matches the reference position information. On accepting the notification instruction, the notification unit of the haptic device notifies the user of an indication indicating that the contact position of the finger is shifted or an indication indicating that the contact position of the finger matches the reference position.

9 Claims, 12 Drawing Sheets (a)

(b)

(51) Int. Cl.
    *G08B 6/00*       (2006.01)
    *G09B 19/00*    (2006.01)
(58) Field of Classification Search
    USPC ............................................ 340/407.1, 407.2
    See application file for complete search history.

(56) References Cited

U.S. PATENT DOCUMENTS

| | | | |
|---|---|---|---|
| 2017/0200881 A1* | 7/2017 | Gdala | ................ G06F 3/016 |
| 2018/0101262 A1* | 4/2018 | Hu | .................... G06F 1/1633 |
| 2018/0188883 A1* | 7/2018 | Bytheway | ............ A63F 13/218 |
| 2018/0369865 A1 | 12/2018 | Shoji et al. | |

FOREIGN PATENT DOCUMENTS

| | | | |
|---|---|---|---|
| JP | 2013049956 A | * | 9/2014 |
| JP | 2016049956 A | * | 4/2016 |
| JP | 201733335 | | 2/2017 |
| JP | 201737583 | | 2/2017 |
| JP | 1571053 | | 3/2017 |
| WO | 2017115729 | | 6/2017 |

\* cited by examiner

TACTILE SYSTEM

CROSS-REFERENCE TO RELATED APPLICATIONS

This application is a national phase entry of PCT Application No. PCT/JP2019/007222, filed on Feb. 26, 2019, which claims priority to Japanese Application No. 2018-057757, filed on Mar. 26, 2018, which applications are hereby incorporated herein by reference.

TECHNICAL FIELD

The present invention relates to a haptic system that provides a tactile stimulus for users.

BACKGROUND

Terminal equipment using haptic devices using vibration, an electric stimulus, mechanical deformation, a piezoelectric element, and the like, and services using the terminal devices are being developed. The haptic devices are designed assuming, as a base, a specific gripping shape in consideration of a positional relationship of an actuator, an electrode, and the like, mechanical efficiency, and the like for an effective exertion of performance. For example, there is proposed a device that is provided with vibrators at one end and another end of a casing, lets a user place a thumb of a left hand on the one end side and a thumb of a right hand on the other end side to grip the casing, and thereby provides the user with a rotational tactile force sensation (see Patent Literature 1).

Figure 11:
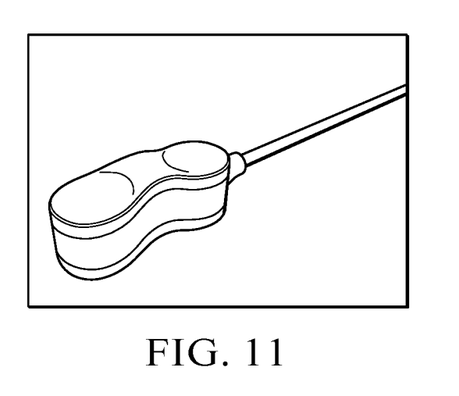
FIG. 11 is a photo shown in Patent Literature 2

The above-described technique has a configuration in which the tactile force sensation is most effectively generated by lightly gripping vicinities of left and right ends of the casing with fingertips. However, in the above-described technique, since the degree of freedom of grip is high, the casing is often not necessarily gripped as intended by a designer. If a different place is gripped, the tactile force sensation of the user will be reduced. Therefore, measures have been taken such as guiding how to grip by the external shape and the like of the casing (see FIG. 11 and Patent Literature 2).

CITATION LIST

Patent Literature

Patent Literature 1: International Publication No. WO 2017/115729
Patent Literature 2: Design Registration No. 1571053

SUMMARY

Technical Problem

However, a human hand can grip an object by adapting to various shapes, and often grips at a place not intended by the designer even if the object has the external shape for guiding like the above-described technique. Since the state of a grip portion tends to be hidden in a palm, it is not easy to check an actual practice or a recorded video of another operator in order for the operator to grasp a correct grip method. When an instructor or the like gives guidance, it is not easy to check the gripping state of the operator. For this reason, for example, it has been necessary in the past for an instructor familiar with characteristics of a haptic device to give guidance by touching fingers of each operator, and there is a problem in that it is not easy to guide how to grip the casing of the haptic device.

Embodiments of the present invention have been made to solve the problems as described above, and an object of embodiments of the present invention is to make it possible to more easily guide how to grip a casing.

Means for Solving the Problem

A haptic system according to embodiments of the present invention includes a haptic device and a control device, wherein the haptic device includes a casing that can be gripped, a sensor that is housed in the casing and detects contact of a finger of a user who grips the casing, a notification unit that accepts a notification instruction and notifies at least one of an indication indicating that a contact position of the finger is shifted from a reference position and an indication indicating that the contact position of the finger matches the reference position, and a tactile stimulus generation unit that provides a tactile stimulus for the user gripping the casing, and the control device includes a determination unit that determines whether sensor information on the contact position of the finger detected by the sensor matches preset reference position information, and an instruction unit that transmits the notification instruction to the notification unit in at least one of cases where the sensor information does not match the reference position information and where the sensor information matches the reference position information.

In the haptic system, the haptic system includes a plurality of the haptic devices, wherein for each of the haptic devices, the determination unit determines whether the sensor information on the contact position of the finger detected by the sensor matches the preset reference position information, and for each of the haptic devices, the instruction unit transmits the notification instruction to the notification unit.

In the haptic system, a plurality of the sensors are provided in the casing, and the determination unit uses, as the sensor information, a combination of detection results of the contact of the finger by the plurality of sensors or a value derived by a specific relational formula from the detection results of the contact of the finger by the plurality of sensors.

In the haptic system, the sensor may be of a capacitance type.

In the haptic system, the tactile stimulus generation unit may be composed of an actuator that generates mechanical vibration. The actuator provides a tactile stimulus, for example, by asymmetrical vibration. In this case, at least one of electrodes constituting the sensor is preferably connected to an exterior of the actuator so as to be common or electrically equipotential.

In the haptic system, the tactile stimulus generation unit may be composed of electrodes that provide an electric stimulus to a finger. In this case, at least one of the electrodes constituting the sensor is preferably connected to the electrodes constituting the tactile stimulus generation unit so as to be common or electrically equipotential.

Effect of Embodiments of the Invention

As described above, according to embodiments of the present invention, it is possible to obtain an excellent effect in which how to grip the casing can be more easily guided.

DETAILED DESCRIPTION OF ILLUSTRATIVE EMBODIMENTS

Figure 1:
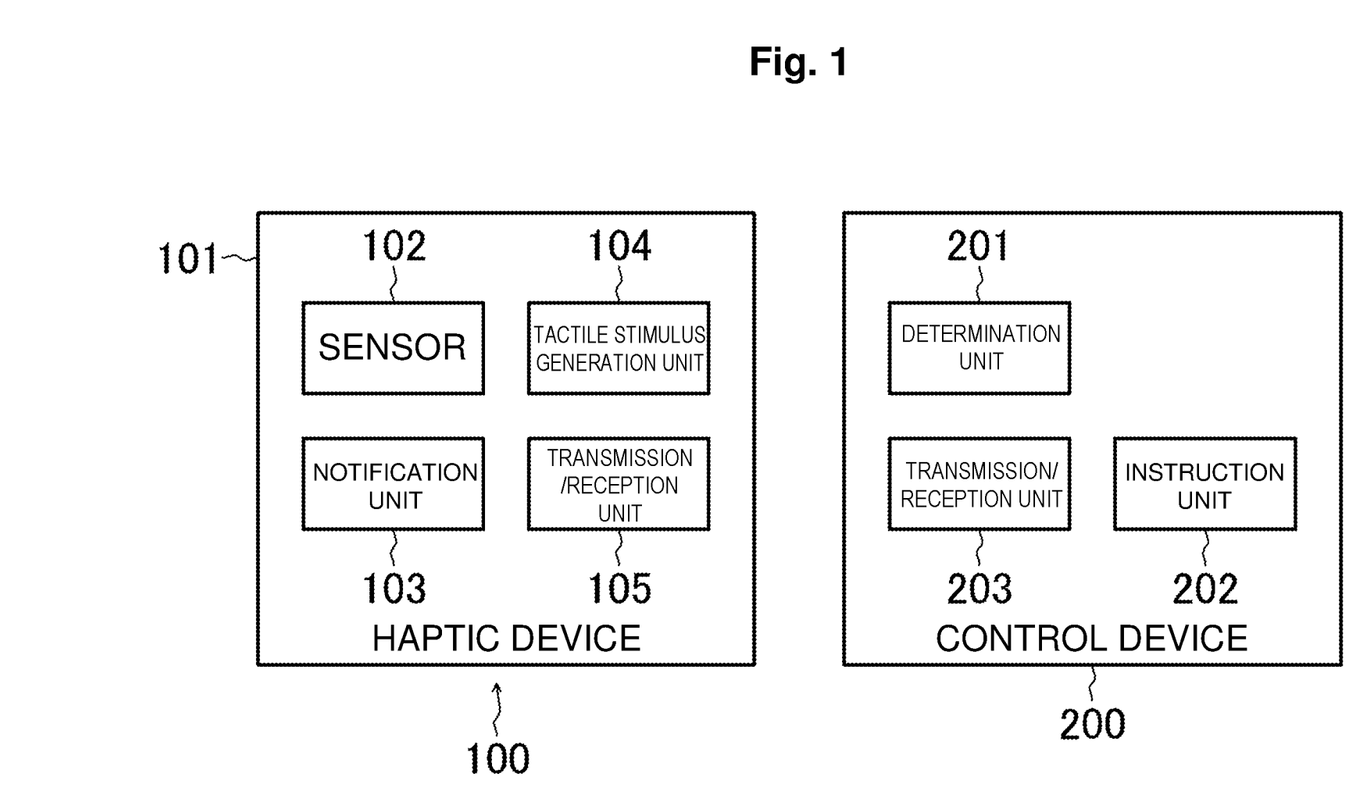
FIG. 1 is a configuration diagram showing a configuration of a haptic device according to an embodiment of the present invention.

Hereinafter, a haptic system according to an embodiment of the present invention will be described with reference to FIG. 1. The haptic system includes a haptic device 100 and a control device 200.

The haptic device 100 includes a casing 101, a sensor 102, a notification unit 103, and a tactile stimulus generation unit 104. The haptic device 100 further includes a transmission/reception unit 105.

Figure 2:
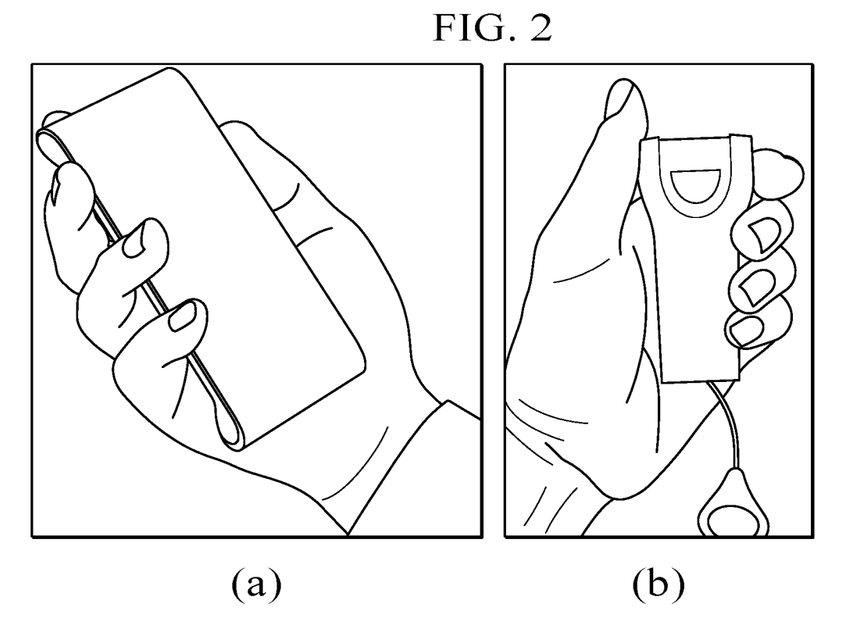
FIG. 2 is a photo showing an example of the haptic device.

The casing 101 has an external shape that can be gripped by a hand of a user, for example, as exemplified in a photo in FIG. 2. The sensor 102 detects contact of a finger of the user who grips the casing 101. Sensor information on a contact position of the finger detected by the sensor 102 is transmitted to the control device 200 by the transmission/reception unit 105. The sensor 102 is, for example, of a capacitance type. The sensor 102 is housed in the casing 101.

The notification unit 103 accepts a notification instruction and notifies at least one of an indication indicating that the contact position of the finger is shifted from a reference position and an indication indicating that the contact position of the finger matches the reference position. The notification instruction is received by the transmission/reception unit 105 and accepted by the notification unit 103. The tactile stimulus generation unit 104 provides a tactile stimulus for the user gripping the casing 101. The tactile stimulus generation unit 104 is composed of, for example, an actuator that generates mechanical vibration. The actuator provides a tactile stimulus, for example, by asymmetrical vibration. The tactile stimulus generation unit 104 is composed of, for example, electrodes that provide an electric stimulus to a finger. The notification unit 103 and tactile stimulus generation unit 104 are housed in the casing 101.

The control device 200 includes a determination unit 201 and an instruction unit 202. The control device 200 further includes a transmission/reception unit 203.

The determination unit 201 determines whether sensor information on the contact position of the finger detected by the sensor 102 of the haptic device 100 matches preset reference position information. When the sensor information does not match the reference position information, it can be determined that the gripping position is shifted. The sensor information is transmitted from the transmission/reception unit 105 of the haptic device 100, received by the transmission/reception unit 203 of the control device 200, and accepted by the determination unit 201.

For example, a plurality of sensors 102 are provided in the casing 101, and the determination unit 201 uses, as sensor information, a combination of detection results of contact of a finger by the plurality of sensors 102. In addition, the determination unit 201 uses, as sensor information, a value derived by a specific relational formula from the detection results of contact of the finger by the plurality of sensors 102.

In at least one of cases where the sensor information does not match the reference position information and where the sensor information matches the reference position information, the instruction unit 202 transmits a notification instruction to the notification unit 103. The instruction unit 202 sends the notification unit 103 a notification instruction for notifying no matching when the sensor information does not match the reference position information. In addition, the instruction unit 202 sends the notification unit 103 a notification instruction for notifying matching when the sensor information matches the reference position information. The notification instruction is transmitted to the haptic device 100 by the transmission/reception unit 203, received by the transmission/reception unit 105 of the haptic device 100, and accepted by the notification unit 103.

The notification unit 103 that has accepted the notification instruction notifies the user that the contact position of the finger is shifted or that the contact position of the finger matches the reference position according to the specifics of the accepted notification instruction. Since the notification instruction indicating that the contact position of the finger is shifted is transmitted when it is determined that the sensor information does not match the reference position information and the gripping position is shifted as described above, the user can recognize that the contact position of the finger gripping the casing 101 is shifted on the basis of notification by the notification unit 103 that has accepted the notification instruction.

The control device 200 is computer equipment including, for example, a CPU (Central Processing Unit), a main storage device, an external storage device, and a network connection device (transmission/reception unit), the CPU operates by a program developed on the main storage device, and thereby each function described above is implemented.

Figure 3A:
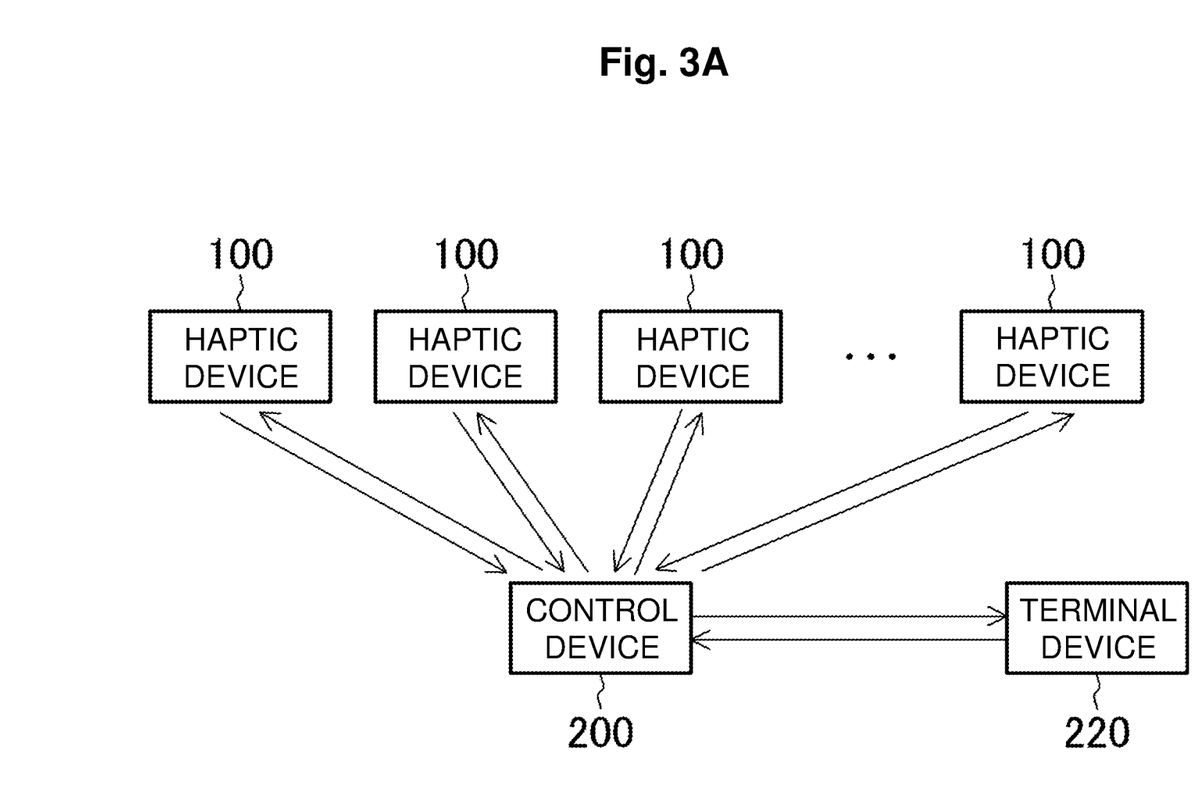
FIG. 3A is a configuration diagram showing another configuration of the haptic device according to the embodiment of the present invention.

As shown in FIG. 3A, sensor information from a plurality of haptic devices 100 may be received by the control device

200. The determination unit 201 of the control device 200 determines regarding each of the plurality of haptic devices 100 whether the sensor information on the contact position of the finger detected by the sensor 102 matches the preset reference position information. In addition, regarding each of the haptic device 100, the instruction unit 202 of the control device 200 transmits the above-described notification instruction to the notification unit 103 of the corresponding haptic device 100 automatically or by operation based on an administrator's decision.

A determination result or the like by the control device 200 may be transmitted to a terminal device 220, and the terminal device 220 may take statistics regarding the gripping position and display the statistic. In addition, the terminal device 220 may manage information on the gripping position in each haptic device 100 in association with position information or an individual identification code of the haptic device 100.

Figure 3B:
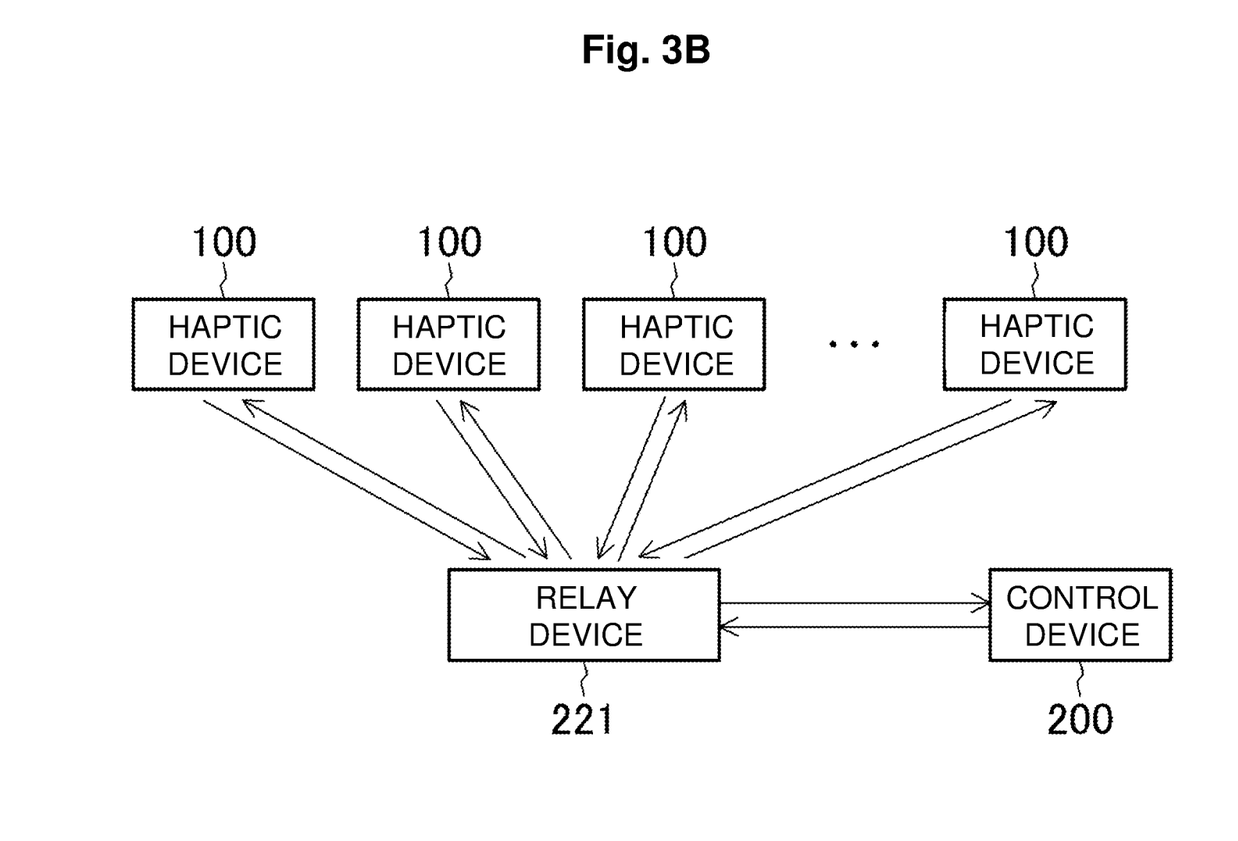
FIG. 3B is a configuration diagram showing another configuration of the haptic device according to the embodiment of the present invention.

As shown in FIG. 3B, the sensor information from the plurality of haptic devices 100 may be relayed by a relay device 221 and transmitted to the control device 200, and the notification instruction from the control device 200 may be relayed by the relay device 221 and transmitted to the corresponding haptic device 100.

Figure 4:
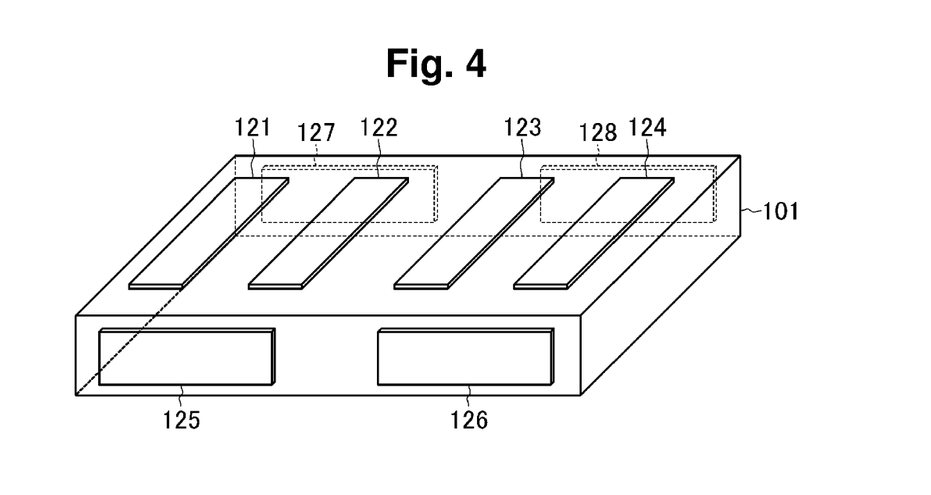
FIG. 4 is a perspective view showing a partial configuration of the haptic device according to the embodiment of the present invention.

The sensor 102 includes, for example, a plurality of electrodes (detection electrodes) 121, 122, 123, 124, 125, 126, and 127, as shown in FIG. 4. The electrodes 121, 122, 123, and 124 are disposed on a main surface of the casing 101. In addition, the electrodes 125 and 126 are disposed on one side surface adjacent to the main surface of the casing 101. The electrodes 127 and 128 are disposed on a side surface facing the side surface where the electrodes 125 and 126 are disposed. Material of the casing 101 at portions where the electrodes 121, 122, 123, 124, 125, 126, and 127 are in contact includes an insulating material such as plastic or hard vinyl.

Figure 5A:
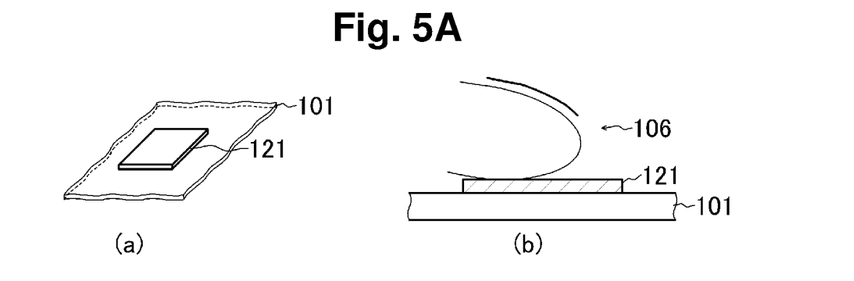
FIG. 5A is a perspective view (a) and a sectional view (b) showing a partial configuration of the haptic device according to the embodiment of the present invention.
Figure 5B:
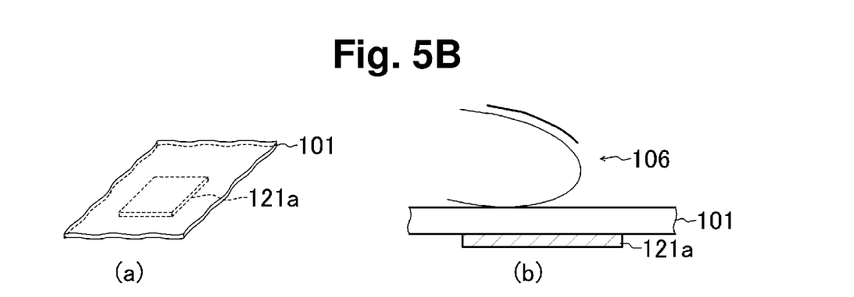
FIG. 5B is a perspective view (a) and a sectional view (b) showing a partial configuration of the haptic device according to the embodiment of the present invention.

The electrodes 121, 122, 123, 124, 125, 126, and 127 detect, for example, capacitance caused by the contact of the finger of the user gripping the casing 101. For example, as shown in FIG. 5A, the electrode 121 is formed on a surface side of the casing 101 and can be contacted by a finger 106. As shown in FIG. 5B, an electrode 121*a* is formed on a backside of the casing 101, and the finger 106 may not contact the electrode 121*a*.

At least one of the electrodes constituting the sensor 102 may be connected to an exterior of an actuator so as to be common or electrically equipotential. When the exterior of the actuator is made of metal and electrically floating, if a finger is disposed even on the casing 101 at this portion, electrostatic coupling occurs. In this case, it is a cause of a decrease in capacitance detection performance by the sensor 102. Here, if the exterior of the actuator is grounded, static electricity generated in the casing 101 is attenuated by the grounding, and therefore it cannot be grounded. On the other hand, the above-mentioned problem can be solved by connecting at least one of the electrodes constituting the sensor 102 to the exterior of the actuator so as to be common or electrically equipotential.

Figure 6:
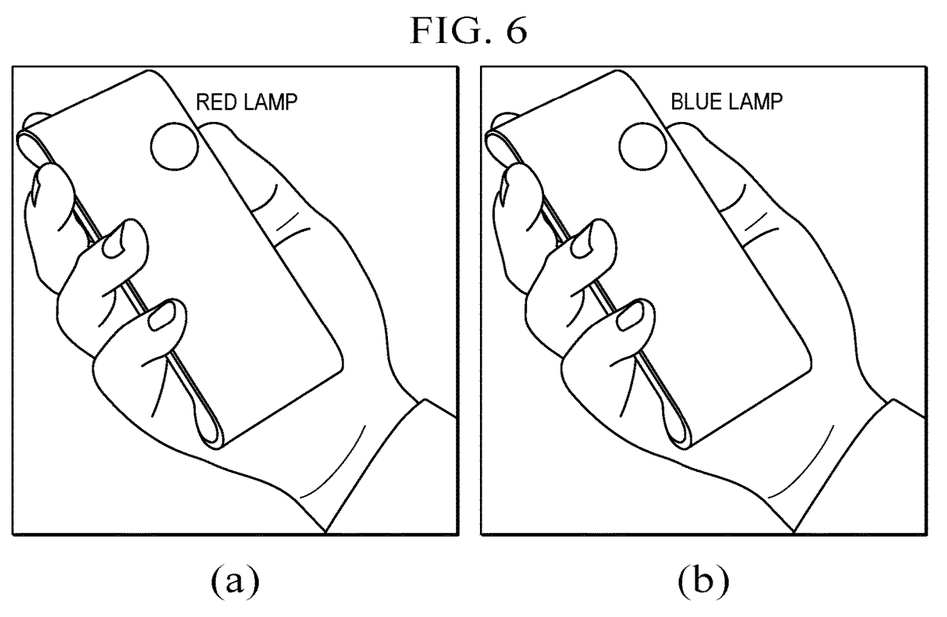
FIG. 6 is a photo showing an example of the haptic device.

Next, a notification example of the determination result will be described. For example, if the sensor information does not match the reference position information and it is determined that the gripping position is shifted, a red lamp is turned on, notifying the user that the contact position (gripping position) of the finger is shifted, as shown in (a) of FIG. 6. On the other hand, if the sensor information matches the reference position information and it is determined that the gripping position is correct, a blue lamp is turned on, notifying the user that the gripping position is correct, as shown in (b) of FIG. 6. Note that by changing brightness, display of graphics or characters, display positions, and the like, the matching or not of the gripping position may be notified.

Figure 7:
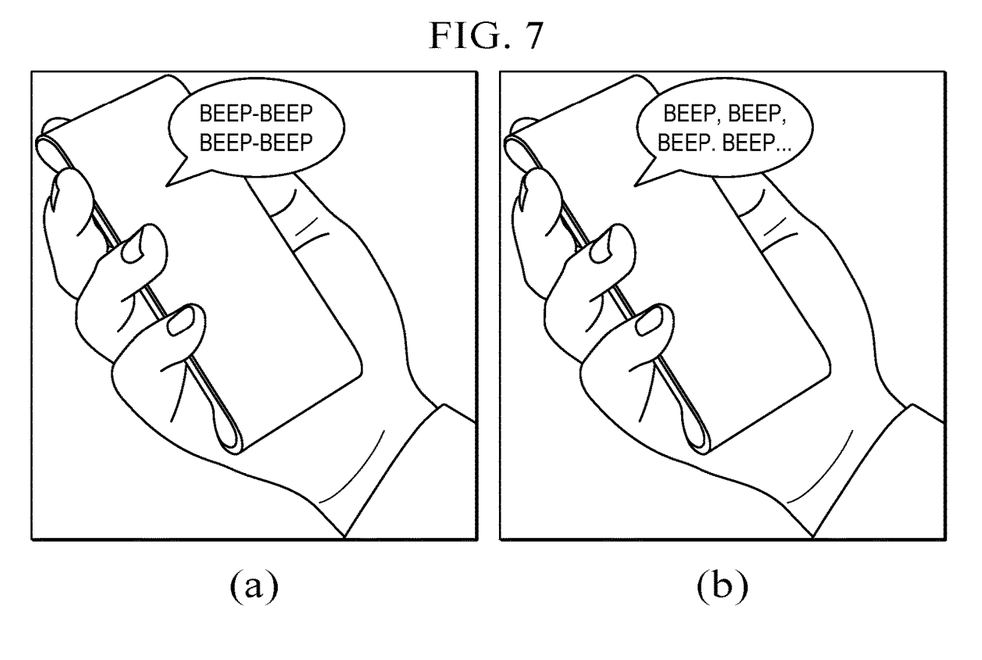
FIG. 7 is a photo showing an example of the haptic device.

For example, if the sensor information does not match the reference position information and it is determined that the gripping position is shifted, the user is notified that the gripping position is shifted by continuous sound from a speaker, as shown in (a) of FIG. 7. On the other hand, if the sensor information matches the reference position information and it is determined that the gripping position is correct, the user is notified that the gripping position is correct by discontinuous sound from the speaker, as shown in (b) of FIG. 7. Note that by changing pitch, volume, melodies, or the like, matching or not of the gripping position may be notified.

Figure 8:
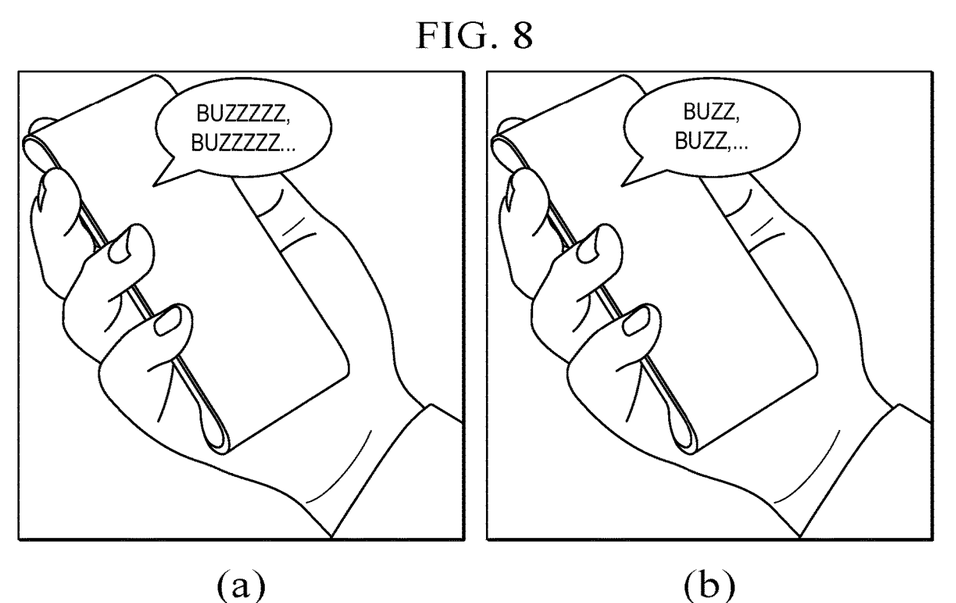
FIG. 8 is a photo showing an example of the haptic device.

For example, if the sensor information does not match the reference position information and it is determined that the gripping position is shifted, the user is notified that the gripping position is shifted by continuous vibration by the actuator, as shown in (a) of FIG. 8. On the other hand, if the sensor information matches the reference position information, and it is determined that the gripping position is correct, the user is notified that the gripping position is correct by discontinuous vibration by the actuator, as shown in (b) of FIG. 8. Note that by changing vibration strength, vibration frequencies, vibration positions, or the like, matching or not of the gripping position may be notified.

Figure 9:
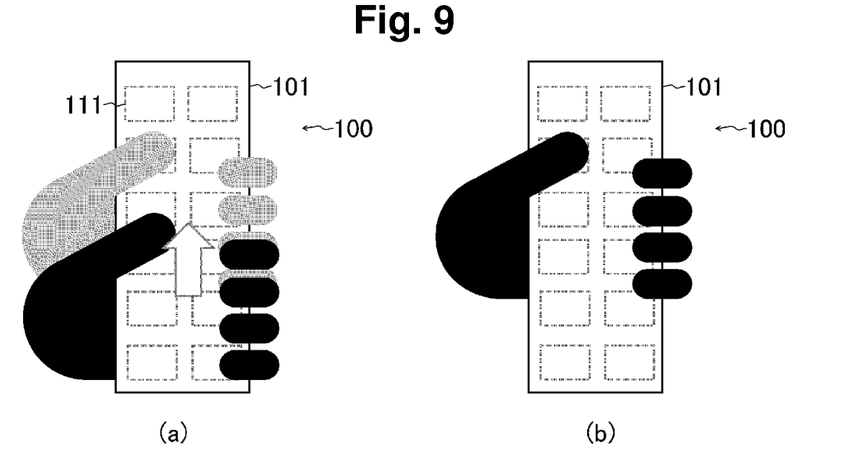
FIG. 9 is an explanatory diagram explaining a guidance example of how to grip using the haptic device according to the embodiment of the present invention.

When the tactile stimulus generation unit 104 is composed of electrodes that provide an electric stimulus to a finger, a plurality of electrodes 111 are provided in the casing 101 of the haptic device 100, as shown in FIG. 9. For example, if the sensor information does not match the reference position information and it is determined that the gripping position is shifted, the electric stimuli by the electrodes 111 are generated in order from a lower side electrode 111 to an upper side electrode 111 in the casing 101, as shown in (a) of FIG. 9. Thereby, the user is prompted to move the hand gripping the casing 101 to the upper side thereof. As shown in (b) of FIG. 9, if the gripping position becomes a correct state, the sensor information matches the reference position information, and it is determined that the gripping position is correct, the electric stimuli by the electrodes 111 are stopped.

For example, a weak current is caused to flow between adjacent electrodes 111 by a stimulation circuit and the current between them is detected by a detection circuit. The above-described circuit is provided for each pair of adjacent electrodes 111. For example, when a thumb and an index finger contact the adjacent electrodes 111, the current flows between the electrodes, and contact is detected. When they do not contact both of the adjacent electrodes in, the current does not flow and it can be determined they do not contact. Note that in this configuration, at least one of the electrodes constituting the sensor 102 is preferably connected to the electrodes constituting the tactile stimulus generation unit 104 so as to be common or electrically equipotential. By doing like this, it becomes possible to prevent a decrease in capacitance detection performance by the sensor 102 in the same manner as described above.

Figure 10A:
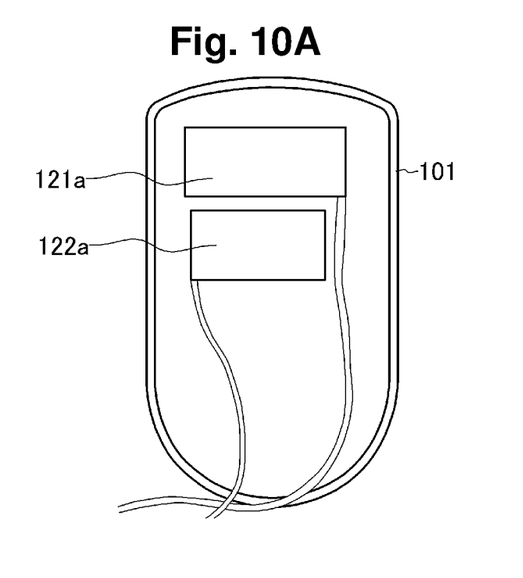
FIG. 10A is a configuration diagram showing a partial configuration of the haptic device according to the embodiment of the present invention.

Next, more detailed description will be made using an example. For example, as shown in FIG. 10A, an electrode 121*a* and an electrode 122*a* for detecting contact of a finger of the user gripping the casing 101 are provided on the backside of the casing 101. When the electrode 121*a* detects contact of a finger to the casing 101 and the electrode 122*a* does not detect contact of a finger to the casing 101, this state is set as a correct gripping state and other states are set as wrong gripping states.

Figure 10B:
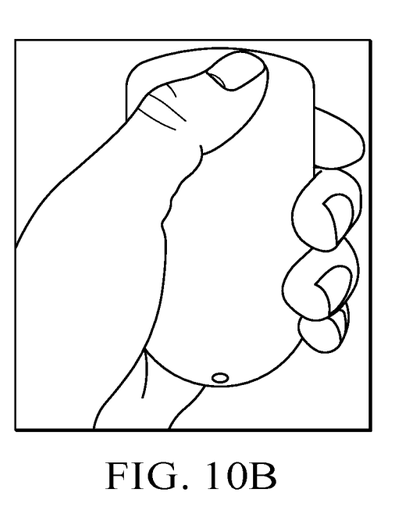
FIG. 10B is a photo explaining a guidance example of how to grip using the haptic device according to the embodiment of the present invention.
Figure 10C:
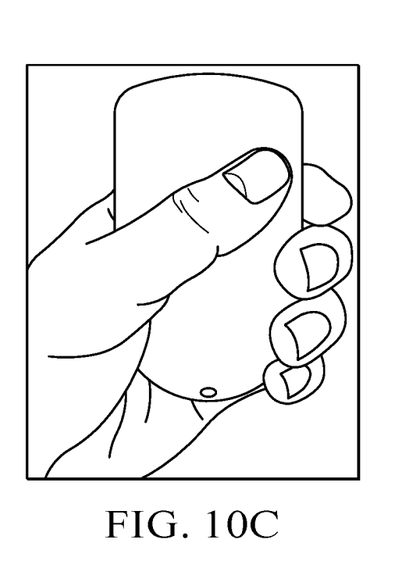
FIG. 10C is a photo explaining a guidance example of how to grip using the haptic device according to the embodiment of the present invention.
Figure 10D:
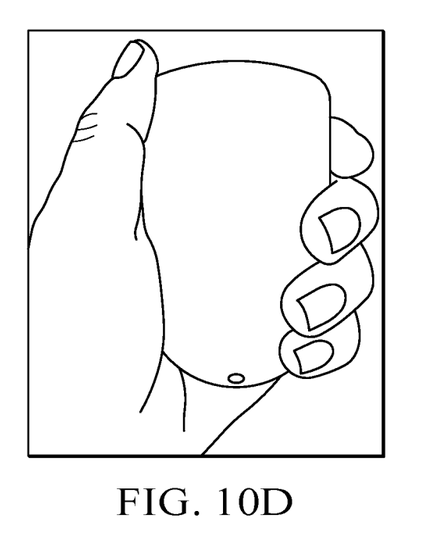
FIG. 10D is a photo explaining a guidance example of how to grip using the haptic device according to the embodiment of the present invention.

In the above-described configuration, as shown in FIG. 10B, when a tip of a thumb is disposed at the position of the electrode 121a, the electrode 121a detects contact of the thumb, whereas the electrode 122a does not detect contact of a finger to the casing 101. As a result, in the state shown in FIG. 10B, the user is notified that the gripping position is correct. On the other hand, in states shown in FIGS. 10C and 10D, since the electrode 121a does not detect contact of a finger, the user is notified that the gripping position is wrong. Furthermore, in the state shown in FIG. 10C, the electrode 122a detects contact of a finger, so it is possible to send (give) the user a notice indicating that the contact position is lower than the predetermined position or the predetermined position is upper than the contact position as a more specific instruction.

As described above, in embodiments of the present invention, the sensor of the haptic device detects contact of the finger of the user gripping the casing, the determination unit of the control device determines whether the sensor information on the contact position of the finger detected by the sensor matches the preset reference position information, and when the sensor information does not match the reference position information, the user is notified that the contact position of the finger is shifted. As a result, according to embodiments of the present invention, it is possible to more easily guide how to grip the casing.

In the related art, as a result of tending to cause grip different from the intention of a designer, a tactile effect is not sufficiently obtained and an optimum state is often not obtained. In addition, even if there is an instructor who gives operation guidance, direct contact with another person is necessary for guidance, and a gripping state may be hidden by a palm or fingers and cannot be sufficiently checked. When an operator is in a remote place or there are many operators, it is hard to individually check. For these reasons, it has been sometimes difficult to exert a sufficient tactile effect.

According to embodiments of the present invention, the tactile effect is sufficiently obtained and the optimum state is obtained. In addition, direct contact with another person for guidance is not necessary and the gripping state can be sufficiently checked. In addition, even when a user (operator) is in a remote place or there are many users (operators), it is possible to individually check. In addition, the gripping state of a human hand obtained from the sensor provided in the haptic device in embodiments of the present invention can be advantageously used for purposes other than feedback to a haptic function, for example, state detection such as whether the haptic device is gripped or left on a desk or the like, or conveying an indication of intention by the presence or absence of a contact position or changing of the position.

Note that the present invention is not limited to the embodiment described above and it is clear that many modifications and combinations can be made by those having ordinary knowledge in the art within the technical idea of the invention.

REFERENCE SIGNS LIST

100 Haptic device
101 Casing
102 Sensor
103 Notification unit
104 Tactile stimulus generation unit
105 Transmission/reception unit
200 Control device
201 Determination unit
202 Instruction unit
203 Transmission/reception unit

The invention claimed is:

1. A haptic system, comprising
   a haptic device comprising:
      a casing; and
      a sensor housed in the casing, the sensor detects contact of a finger of a user gripping the casing; and
   a controller configured to:
      determine whether sensor information on a contact position of the finger detected by the sensor matches preset reference position information;
      transmit a first notification instruction indicating that a contact position of the finger is shifted from a reference position corresponding to the preset reference position information; and
      transmit a second notification instruction indicating that the contact position of the finger matches the reference position; and
   wherein the haptic device is configured to:
      accept the first notification instruction;
      accept the second notification instruction;
      in response to accepting the first notification instruction, provide a first tactile stimulus for the user gripping the casing; and
      in response to accepting the second notification instruction, provide a second tactile stimulus for the user gripping the casing.

2. The haptic system according to claim 1, further comprising:
   a plurality of haptic devices each comprising a respective sensor, wherein the haptic device is one of the plurality of haptic devices, and wherein for each of the plurality of haptic devices, the controller is configured to determine whether respective sensor information on a contact position of the finger detected by the respective sensor matches the preset reference position information.

3. The haptic system according to claim 1, further comprising:
   a plurality of sensors in the casing, wherein the sensor is one of the plurality of sensors, and wherein determining whether the sensor information on the contact position of the finger matches the preset reference position information comprises using, as the sensor information, a combination of detection results of the contact of the finger from the plurality of sensors or a value derived by a relational formula and the detection results of the contact of the finger from the plurality of sensors.

4. The haptic system according to claim 1, wherein the sensor is a capacitance type sensor.

5. The haptic system according to claim 1, wherein the haptic device comprises an actuator, and wherein providing the first or second tactile stimulus comprises providing the tactile stimulus through mechanical vibration generated by the actuator.

6. The haptic system according to claim 5, wherein the mechanical vibration is asymmetrical vibration.

7. The haptic system according to claim 5, wherein the sensor comprises an electrode connected to an exterior of the actuator so as to be common or electrically equipotential.

8. The haptic system according to claim 1, wherein the haptic device comprises first electrodes, and wherein providing the first or second tactile stimulus comprises providing electrical stimulus to the finger through the first electrodes.

9. The haptic system according to claim 8, wherein the sensor comprises a second electrode connected to the first electrodes so as to be common or electrically equipotential.

* * * * *